United States Patent [19]
Lee

[11] Patent Number: 5,781,796
[45] Date of Patent: Jul. 14, 1998

[54] SYSTEM FOR AUTOMATIC CONFIGURATION OF I/O BASE ADDRESS WITHOUT CONFIGURATION PROGRAM USING READOUT DATA ON COMMON BUS BY RESPONDING DEVICE

[75] Inventor: Dong Hoon Lee, Kyungki-do, Rep. of Korea

[73] Assignee: LG Semicon Co., Ltd., Chungcheongbuk-do, Rep. of Korea

[21] Appl. No.: 466,997

[22] Filed: Jun. 6, 1995

[51] Int. Cl.$^6$ .......................... G06F 13/42; G06F 13/368
[52] U.S. Cl. .......................... 395/828; 395/829; 395/823
[58] Field of Search .......................... 395/821, 828, 395/823, 829

[56] References Cited

U.S. PATENT DOCUMENTS

| | | | |
|---|---|---|---|
| 4,912,627 | 3/1990 | Ashkin et al. | 364/200 |
| 5,163,145 | 11/1992 | Parks | 395/500 |
| 5,367,640 | 11/1994 | Hamilton et al. | 395/275 |
| 5,428,748 | 6/1995 | Davidson et al. | 395/275 |
| 5,450,570 | 9/1995 | Richek et al. | 395/500 |
| 5,524,269 | 6/1996 | Hamilton et al. | 395/829 |
| 5,530,895 | 6/1996 | Enstrom | 395/829 |
| 5,553,245 | 9/1996 | Su et al. | 395/284 |

*Primary Examiner*—Thomas C. Lee
*Assistant Examiner*—Rehana Perveen

[57] ABSTRACT

A device and method for assigning an input/output (I/O) base address from a plurality of I/O base addresses to a circuit card in need of an I/O base address and connected to a common bus is disclosed. The method, as carried out by the device, includes the steps of: selecting an I/O base address for consideration; attempting a read operation to read data out of registers of a circuit card corresponding to the I/O address; sensing whether the read operation has resulted in data or a high impedance state on the common bus, the high impedance state indicating that no device has been assigned to the I/O base address and the data indicating that the address is already assigned to another device; assigning the address to the device-in-need if the high impedance state is sensed on the common bus; and selecting another I/O base address for consideration if the data is sensed on the common bus.

13 Claims, 5 Drawing Sheets configuration register

| bit2 | bit1 | bit0 | IO bass address |
|------|------|------|-----------------|
| 0 | 0 | 0 | 0 |
| 0 | 0 | 1 | 1 |
| 0 | 1 | 0 | 2 |
| 0 | 1 | 1 | 3 |
| 1 | 0 | 0 | software |
| 1 | 0 | 1 | 5 |
| 1 | 1 | 0 | 6 |
| 1 | 1 | 1 | 7 | data are random data

SYSTEM FOR AUTOMATIC CONFIGURATION OF I/O BASE ADDRESS WITHOUT CONFIGURATION PROGRAM USING READOUT DATA ON COMMON BUS BY RESPONDING DEVICE

BACKGROUND OF THE INVENTION

The present invention relates to a jumpless configuration, and more particularly to an input/output base setting method and apparatus of the jumpless configuration which is suitable for the input/output base setting.

In a conventional method, as shown in FIG. 1, the configuration of a system element, or a card, is set using jump 13 on the outside of a controller at a card level. In this case, a function such as configuration register 12 is provided inside of chip 11 and a jump line is connected corresponding to the function so that the configuration is set. If the cards are inserted as many as needed, the jump is to be used for each card on the outside of the controller. That means that a user must input data externally to configuration register 12 to select the card. In such a method, however, the user should know all the information of configuration register 12 and the card and cumbersomely input the information. Also, since the numbers of the register and jump inside of chip 11 according to the increase of the number of the card, there are the inconvenience of being complicated in the whole system and a burden of knowing the information of data and card for the user.

FIG. 2 shows a method using serial EEPROM 15, a non-volatile device being capable of reading/writing on the outside of a controller without using a jump, so that the configuration data, which is the information required by the controller, is stored in advance at configuration register 12 to set the configuration and also can be changeable according to the user's demand. In this case, configuration register 12 and EEPROM interface logic 14 which interconnects configuration register 12 and serial EEPROM 15, are required. Additionally, software to select the card is required. The method as FIG. 2 is much used for a controller which requires lots of setting a configuration. Especially, in a card for communication, where an identification for each card is needed, an EPROM or an EEPROM for matching each card is employed. In case of a local area network (LAN) card, identification data of six bytes should be necessarily used, and to operate the card, an input/output base address, an interrupt number, memory base address, etc., must be determined by a jumper or jumpless method.

Hereinafter, the required configuration from serial EPROM 15, especially what to use as the base of an input/output address (IO address) needed in receiving the data of configuration register part 12 inside of the controller, is explained.

The IO Base Address is used to read or write the data of configuration register part 12 inside of the controller, and is distinctly recognized by using the different input/output base address for each card. When a configuration is set by the jump, a user changes jump setting by manually allocating the input/output base address which the other card does not use. However, when the configuration is set by using serial EEPROM 15, it can be possible to access directly data from serial EEPROM 15 in the card itself after the input/output base is determined. To solve such a problem, an apparatus using a conventional art sets the input/output base as in the flowchart of the soft routine in FIG. 3. In FIG. 3, before passing the flowchart of FIG. 3, the input/output base, being set as a default after power is turned on, is kept in a software setting state after data is loaded in hardware from serial EEPROM 15, so as to make it possible to take the step in the flowchart, where it is detected whether the bit |2:0| of configuration register 12 in FIG. 3 is 100 or not. In case of an input/output base of 100 by software, for example, printer data port 278h performs writing continuously four times and at the fourth time, the value of bit |2:0| is set as 100. However, there is little probability that the four-time continuous writing occurs. When the 278h port is continuous written four times, the bit |2:0| value is set in hardware. If not 100, the card corresponding to the address of the relevant case is operated by software being set in the EEPROM. In the conventional method, a user should know previously the jump and the input/output base address to set of FIGS. 1 and 3, respectively, and in FIG. 3, an additional software routine must be provided, which have been inconvenient.

SUMMARY OF THE INVENTION

To solve the above problems, it is an object of the present invention to provide an input/output base setting method and apparatus of the jumpless configuration which is suitable for the input/output base setting.

Accordingly, to achieve the above object, there is provide an input/output base setting method of a jumpless configuration, comprising the steps of: recording a plurality of an input/output base address in one memory; recording the input/output base address one by one in an arbitrary order in system elements of the same number as the input/output base address; reading the input/output base addresses recorded in the memory one by one in an arbitrary order, reading also the address of the memory and the addresses recorded in the system elements one by one in an arbitrary order, and then, comparing both the addresses; making identification number data of the same number as the addresses; and allocating the identification number data in order to the relevant system element only when the two addresses read in the comparing step.

To achieve the above object, there is provided an input/output base setting apparatus comprising: a dummy register for storing a plurality of input/output base addresses in a memory, and when each stored address and an address recorded in each system element are congruous, outputting the congruous address; a control and address generator for receiving an input/output read negation signal, a master signal from a system control means or the system elements and a system address, controlling the output of the dummy register and outputting a result data which determines the input/output base address; a comparator for outputting a selection signal by the control of the control and address generator when the address output from the memory and the address recorded in the system elements; and a configuration register for inputting the result data when the selection signal is output from the comparator and outputting an address which selects the relevant system element according to the result data.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
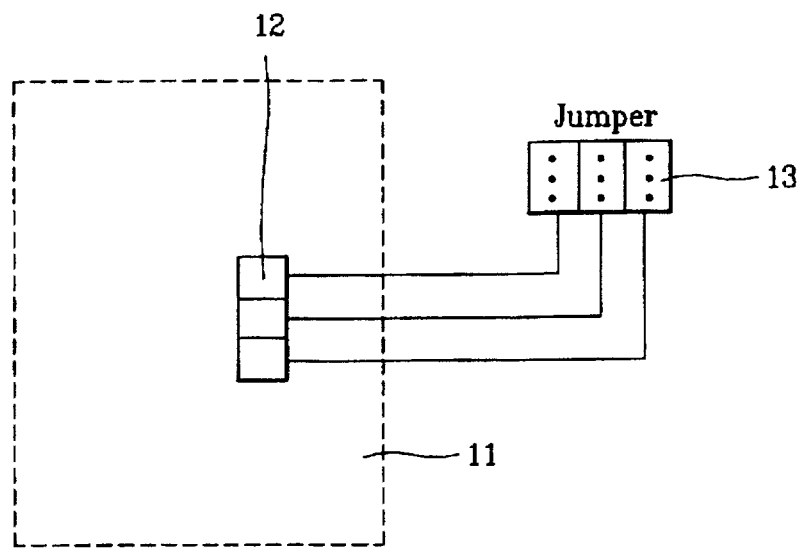
FIG. 1 is a view illustrating the constitution of the configuration setting method using a jump.
Figure 2:
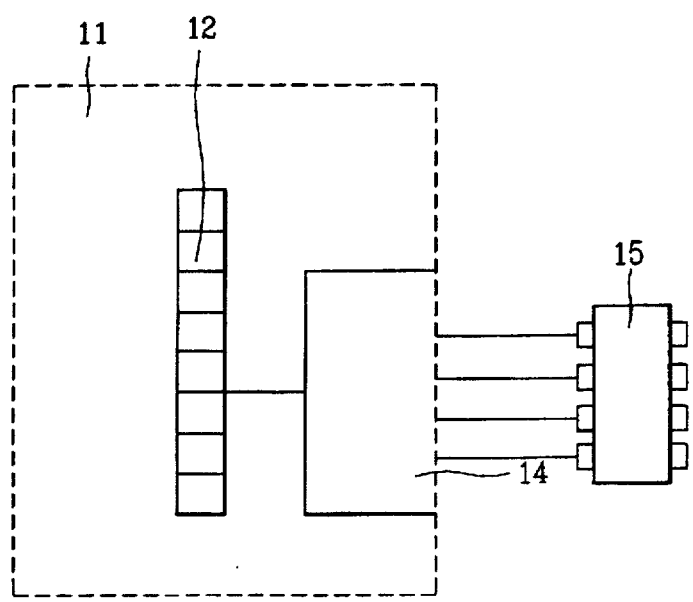
FIG. 2 is a view illustrating a jumpless configuration setting using a serial EEPROM device.
Figure 3:
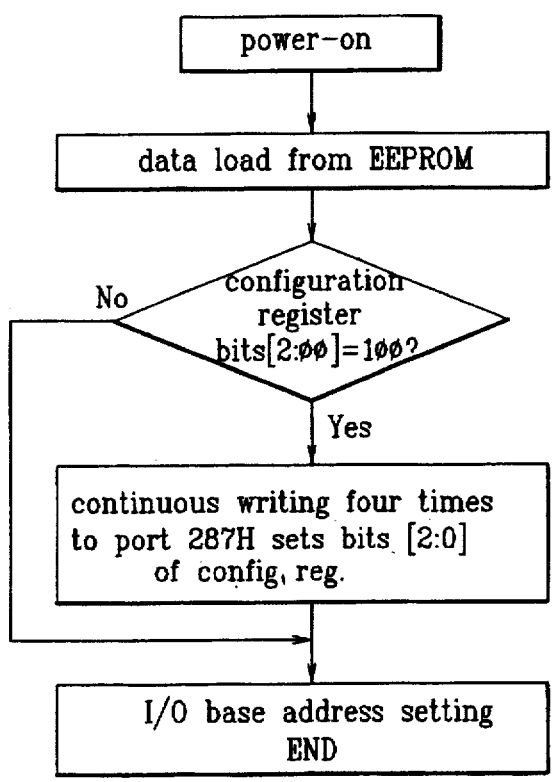
FIG. 3 is a flowchart explaining an apparatus of a conventional art.
Figure 4:
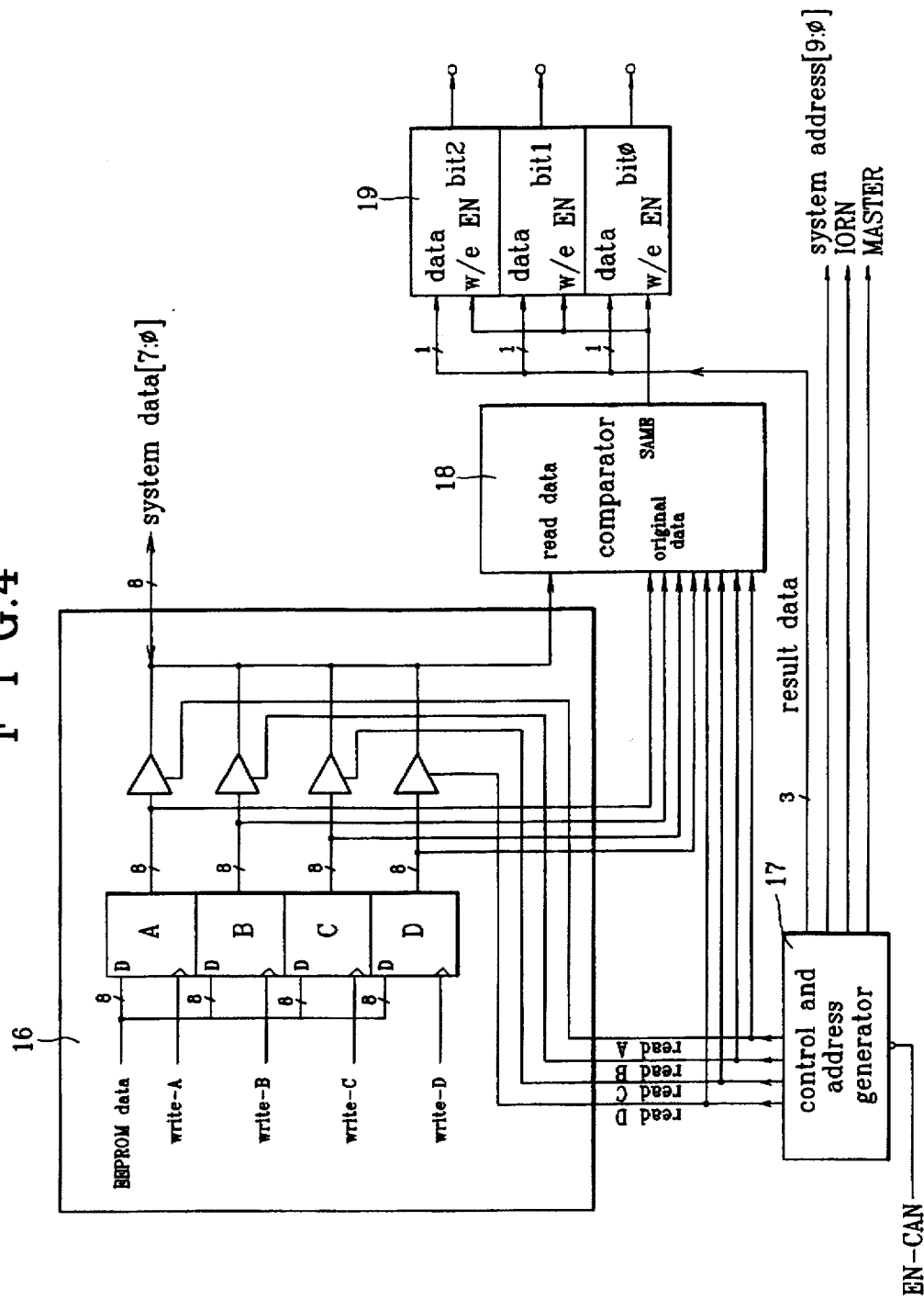
FIG. 4 is a view illustrating the constitution of the present invention.
Figure 5A:
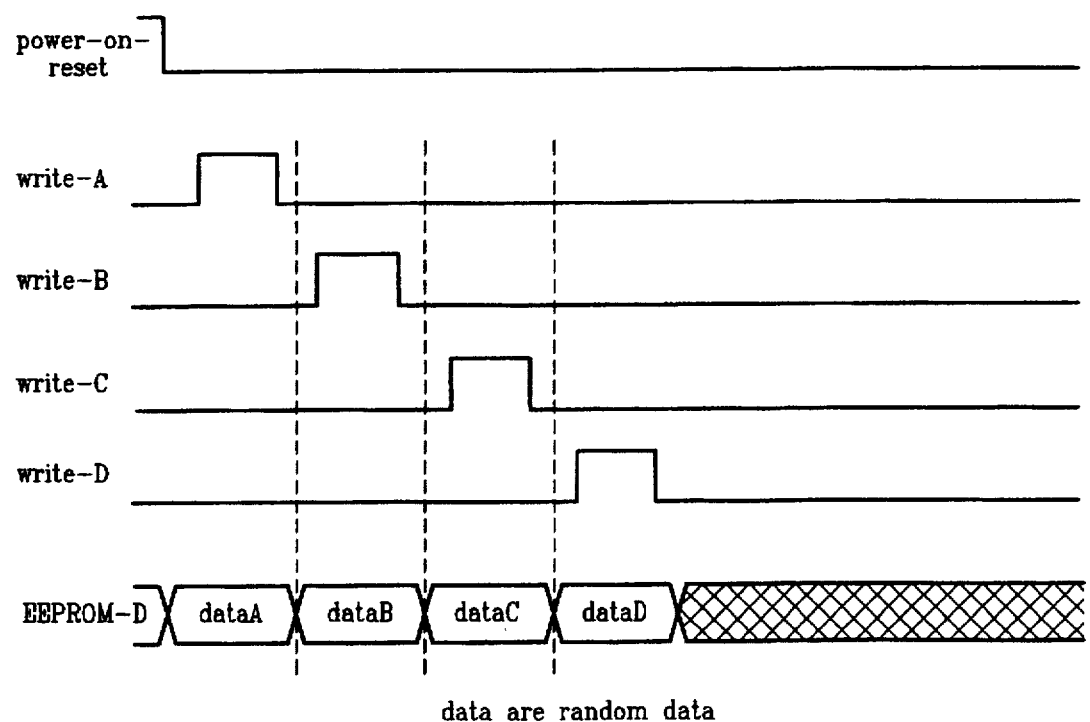
FIGS. 5A and 5B showing the time flow of the present invention.

In FIG. 4, the circuit of the present invention is composed of dummy register 16 for temporarily storing in registers the serial data of an EEPROM, control & address generator 17 for receiving a signal, such as a mastern signal, an input/output read negation (IORN), a system address and an enable can, and for outputting a read signal, comparator 18 of which output is determined according to the output of dummy register 16 and a tri-state buffer, and configuration register 19. FIG. 5 is an operation timing diagram.

When the system is powered, a power-on-reset becomes active. After the power-on-reset, dummy register 16 loads data from the external serial EEPROM at the time when a write timing signal goes high corresponding to each write signal. At that time, The data A, B, C and D of FIG. 4, which correspond to the address of a card and set in advance, are written in the serial EEPROM. After data is loaded from the serial EEPROM, each data A, B, C and D is written anew in the registers A, B, C and D of dummy register 16. Each data is input to the original data port of comparator 18, and according to the on/off of the tri-state buffer, the input signal is synthesized with system data [7:0] when the buffer is on. If the two signals are congruous, the system address is input to read data port, and if not exactly congruous, a null address is input to the port. Comparator 18 outputs the register data of dummy register 16 according to the read signal generated from control and address generator 17 when the tri-state buffer is on. Also, the comparator synthesizes the output data with system data [7:0] which can be read out from the other card and input to the read data port. Then, the comparator compares the input data with each original data of dummy register 16. When the compared four data is all congruous and same as the read data, a same signal goes high to activate a write enable signal of configuration register 19. With this operation, the comparator also outputs to configuration register the result data [2:0] of control and address generator 17.

Control and address generator 17 outputs the read signals A, B, C and D and the result data to the tri-state buffer and configuration register 19, and also, receives system address [9:0], IORN signal and the mastern signal. The control and address generator activates the mastern signal after data is loaded from the serial EEPROM so as to perform input/output read operation to and from the system. The timing of FIG. 5B repeats till the same signal goes high from IO base address 0 to IO base address 7.

Here, the number of IO base can be increased up to N by increasing the number of dummy register (16) register and the number of configuration register (19) bit, thus, the system can be configured corresponding to the N-number of cards which can be selected.

In FIG. 5, after the power-on-reset is done, arbitrary data is read from the serial EEPROM and written in the register of dummy register 16. Here, the arbitrary data must be exist in the address of the selected card stored in the serial EEPROM. That is, the address of the serial EEPROM should be selected by the agreement between the serial EEPROM and the controller.

Figure 5B:
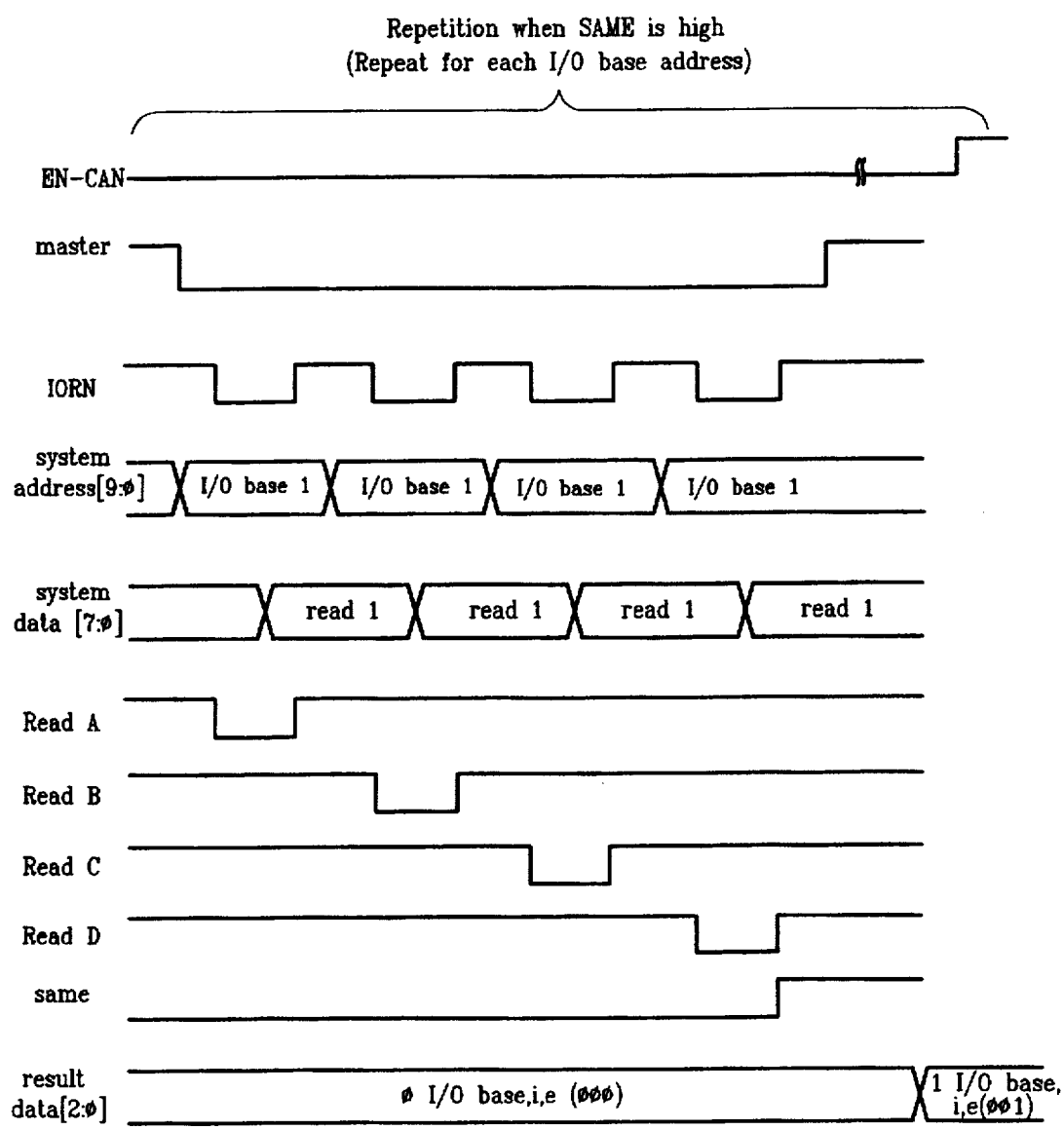

After the writing process is over, the timing as in FIG. 5B is generated from control and address generator 17, so that data being fit to the IO base is read out from all the card connected to 8-bit system data [7:0] bus. That is, when the mastern signal goes low, it is possible that the input/output red negation signal is output not by a microprocessor but from the card. Namely, the controller embodied by the present invention transmits IORN signal and IO base address made of system address [9:0] to all the other card so that it is detected whether the IO base address is in use.

The IO base address is sequentially generated from 0 to 7 and halts the operation of comparator 18 when the comparator (18) output same goes high. Comparator 18 the original data read from the EEPROM of dummy register 16 and the data read from the other card having performed IO read operation according to each IO base. If the compared data has the same value, the same signal is made high and the code value of the IO base is written in a configuration register (19) bit [2:0]. Here, the fact that the read code value is different from that of the other card, means that the compared value is different from the value read from a red port of dummy register 16, i.e., the other card uses the IO base which performs the read operation.

In this case, the same signal goes low and the IO base is generated by control and address generator 17 so that the IO read process is carried out again.

As described above, in the present invention an additional software routine and the software setting for it are not needed to set the IO base in a jumpless configuration. Therefore, the method of the present invention is an full automatic IO base configuration method needing no additional effort of a user.

Also, the method of the present invention is for a jumpless IO base setting where a use is extended since the jumpless portion becomes much larger, which can be available for a use by extending the range or number of the IO base to be set and by the fact that an extension use of the card number is possible by changing the numbers of the register of dummy register 16 and the bit of configuration register 19.

What is claimed is:

1. An automatic configuration apparatus of an input/output base address comprising:
    a plurality of registers for storing a plurality of predetermined data transmitted from a memory according to a write enable signal;
    a plurality of tri-state buffers for buffering each of the plurality of predetermined data according to a read enable signal;
    a control and address generator for outputting a plurality of system control signals, a system address signal, a predetermined I/O base address signal and the read enable signal;
    synthesizer means for combining each of the plurality of predetermined data and system data to produce combination data;
    compare means for comparing the plurality of each predetermined data with said combination data; and
    a configuration register for receiving information representing the predetermined I/O base address according to an output of the compare means.

2. An automatic configuration apparatus of an input/output base address as claimed in claim 1, wherein the plurality of system control signals includes an input/output read negation signal and a MASTER signal.

3. An automatic configuration method of an input/output base address, comprising the steps of:
    recording a plurality of predetermined data transmitted from a memory;

outputting a plurality of system signals and a system address to a system and generating a plurality of read enable signals;

buffering each of the plurality of predetermined data according to each of the plurality of read enable signals and outputting a system data simultaneously;

combining each of the plurality of predetermined data and system data to produce combination data;

comparing each of the plurality of predetermined data with said data to produce a comparison result;

outputting information representing a predetermined I/O base address data to a configuration register; and setting said information representing said predetermined I/o base address data in said configuration register according to said comparison result.

4. A method for assigning an input/output (I/O) base address from a plurality of I/O base addresses to a device in need of an I/O base address and connected to a common bus, the method comprising the steps of:

selecting an I/O base address for consideration;

attempting a read operation to read data out of registers of a device corresponding to said I/O address;

sensing as a function of a combination of predetermined data with data that might be placed upon said common bus as a result of said read operation, whether said read operation has resulted in data or a high impedance state on said common bus, said high impedance state indicating that no device has been assigned to said I/O base address and said data indicating that said address is already assigned to another device;

assigning said address to said device-in-need if said high impedance state is sensed on said common bus; and not assigning said address to said device-in-need if said data is sensed on said common bus.

5. The method as in claim 4, further comprising:

selecting another I/O base address for consideration if said data is sensed on said common bus.

6. The method as in claim 4, wherein said step of sensing includes:

reading said predetermined data from a non-volatile memory of said device-in-need;

combining results of said read operation data with said data from said device-in-need to form said combination;

comparing said data from said device-in-need against said combination to form a comparison result;

identifying a high impedance state on said common bus if said comparison result indicates that said combination and said data from said device-in-need are the same; and identifying data on said common bus if said comparison result indicates that said combination and said data from said device-in-need are different.

7. The method as in claim 6, wherein said step of combining includes performing a logical AND operation on said results of said read operation and said data from said device-in-need.

8. The method as in claim 7 wherein said logical AND operation is a hard-wired AND operation.

9. A device for assigning an input/output (I/O) base address from a plurality of I/O base addresses to a circuit card in need of an I/O base address and connected to a common bus, the device comprising:

a controller for selecting an I/O base address for consideration;

said controller also being for attempting a read operation to read data out of registers of a circuit card corresponding to said I/O address;

a sensing circuit, under control of said controller, for sensing as function of a combination of predetermined data with data that might be placed upon said common bus as a result of said read operation, whether said read operation has resulted in data or a high impedance state on said common bus, said high impedance state indicating that no circuit card has been assigned to said I/O base address and said data indicating that said address is already assigned to another circuit card; and said controller also being for assigning said address to said circuit card-in-need if said high impedance state is sensed on said common bus, and for not assigning said address to said circuit card-in-need if said data is sensed on said common bus.

10. The device as in claim 9, wherein said controller is also for selecting another I/O base address for consideration if said data is sensed on said common bus.

11. The device as in claim 9, wherein said sensing circuit includes:

a plurality of flip-flops for temporarily storing said predetermined data read, under the control of controller, from a non-volatile memory device of said circuit card-in-need;

a plurality of tri-state buffers, under the control of said controller, for connecting outputs of said flip-flops to a data portion of said common bus, respectively; and a comparator, under the control of said controller, for comparing said outputs of said flip-flops with a voltage on said data portion of said common data bus; and wherein said controller is also for controlling said tri-state buffers to pass voltages on said outputs of said flip-flops to logically combine said outputs with said results of said read operation to form said combination.

12. The device as in claim 11, wherein said logical combination is a logical AND operation.

13. The device as in claim 12, wherein said logical AND operation is a hard-wired AND operation.

* * * * *